US009943951B2

(12) United States Patent
Munguia

(10) Patent No.: US 9,943,951 B2
(45) Date of Patent: Apr. 17, 2018

(54) VALVE CORE REMOVER EXTENSION

(71) Applicant: Adam Conrado Munguia, Houston, TX (US)

(72) Inventor: Adam Conrado Munguia, Houston, TX (US)

(73) Assignee: Adam Munguia, Houston, TX (US)

( * ) Notice: Subject to any disclaimer, the term of this patent is extended or adjusted under 35 U.S.C. 154(b) by 694 days.

(21) Appl. No.: 14/072,643

(22) Filed: Nov. 5, 2013

(65) Prior Publication Data

US 2014/0215786 A1 Aug. 7, 2014

Related U.S. Application Data

(60) Provisional application No. 61/796,271, filed on Nov. 6, 2012.

(51) Int. Cl.
*B23P 19/04* (2006.01)
*B25B 27/24* (2006.01)

(52) U.S. Cl.
CPC ......... *B25B 27/24* (2013.01); *Y10T 29/53596* (2015.01)

(58) Field of Classification Search
CPC .......................... B25B 27/24; Y10T 29/53596
USPC .......................................................... 81/177.2
See application file for complete search history.

(56) References Cited

U.S. PATENT DOCUMENTS

2009/0038081 A1* 2/2009 Berton et al. ...................... 7/100
2010/0000380 A1* 1/2010 Richardson ............. B25B 13/04 81/177.8

* cited by examiner

*Primary Examiner* — Monica Carter
*Assistant Examiner* — Nirvana Deonauth

(57) ABSTRACT

Extended adapters for a tool having a shut-off valve assembly used on pressurized refrigeration systems comprises: an extended rod assembly, a 4⅛"L adapter, a 6⅞"L adapter, a 20 degree offset adapter and a 90 degree adapter; the adapters couple the first opening and second opening of shut-off valve assembly; when the 4⅛"L or 6⅞"L extended adapter coupled to second opening of shut-off valve; wherein the extended rod assembly coupled to the adapter and adapted to couple the second opening, the extended rod assembly having a rod adapted to move through the passageway of the extended adapters and the shut-off valve when open, these adapters allow the valve core remover tool to function clear from obstructions.

8 Claims, 8 Drawing Sheets

VALVE CORE REMOVER EXTENSION

BACKGROUND OF INVENTION

In the HVAC field it has become very important, when servicing pressurized refrigeration systems, to remove and replace leaking valve core elements. The EPA has a great concern on the handling and release of refrigerant gases. There is a tool on the market used in the HVAC field that will safely remove and replace valve core elements, such as the Schrader-type from pressurized air conditioning systems. This tool is called a valve core removal tool, comprising a shut off valve assembly, but there is issues with this tool being obstructed, and is unable to couple onto many air conditioning systems valve access points.

There seemed to be a need for a solution, so the valve core extensions were created in several variations to assist and provide the existing valve core remover tool better accessibility from obstructions.

SUMMARY OF THE INVENTION

The present invention is a set of extended adapters that is capable of being used with a tool for pressurized refrigeration systems. The adapter set comprises: a 4⅛"L adapter, a 6⅞"L adapter, a 20 degree offset adapter, a 90 degree adapter and an extended rod assembly, and are able to couple to the tool used for pressurized refrigeration systems shut-off valve assembly, allowing the same passageways needed to engage and remove the valve core elements.

FIELD OF THE INVENTION

This invention is capable of being used with a tool for removing valve elements from pressurized air conditioning systems.

DETAILED DESCRIPTION OF DRAWINGS (FIGS. 1-8)

Figure 1:
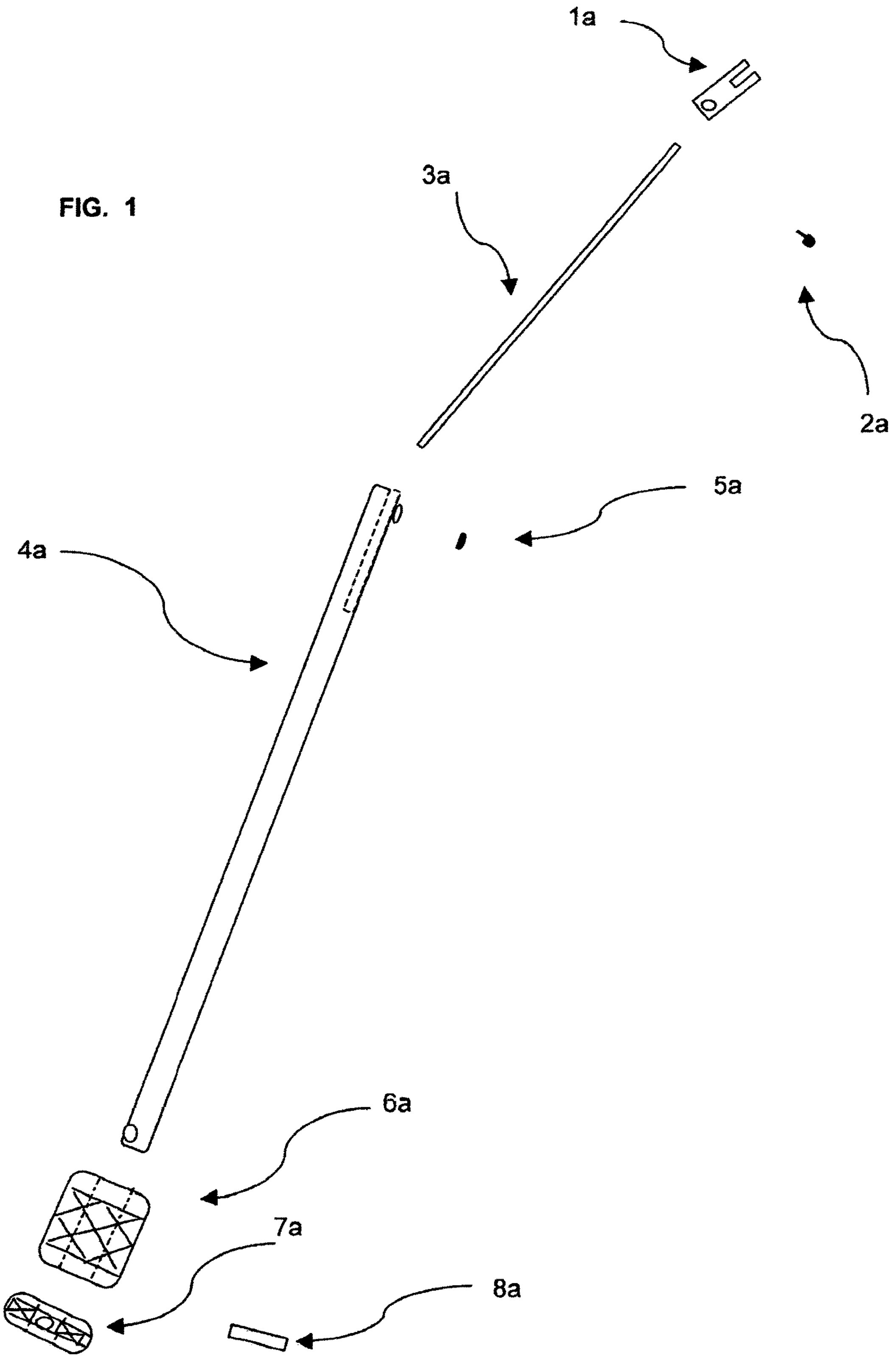
FIGS. 1 and 1*a* show the various components of the extended rod assembly 500.
Figure 1A:
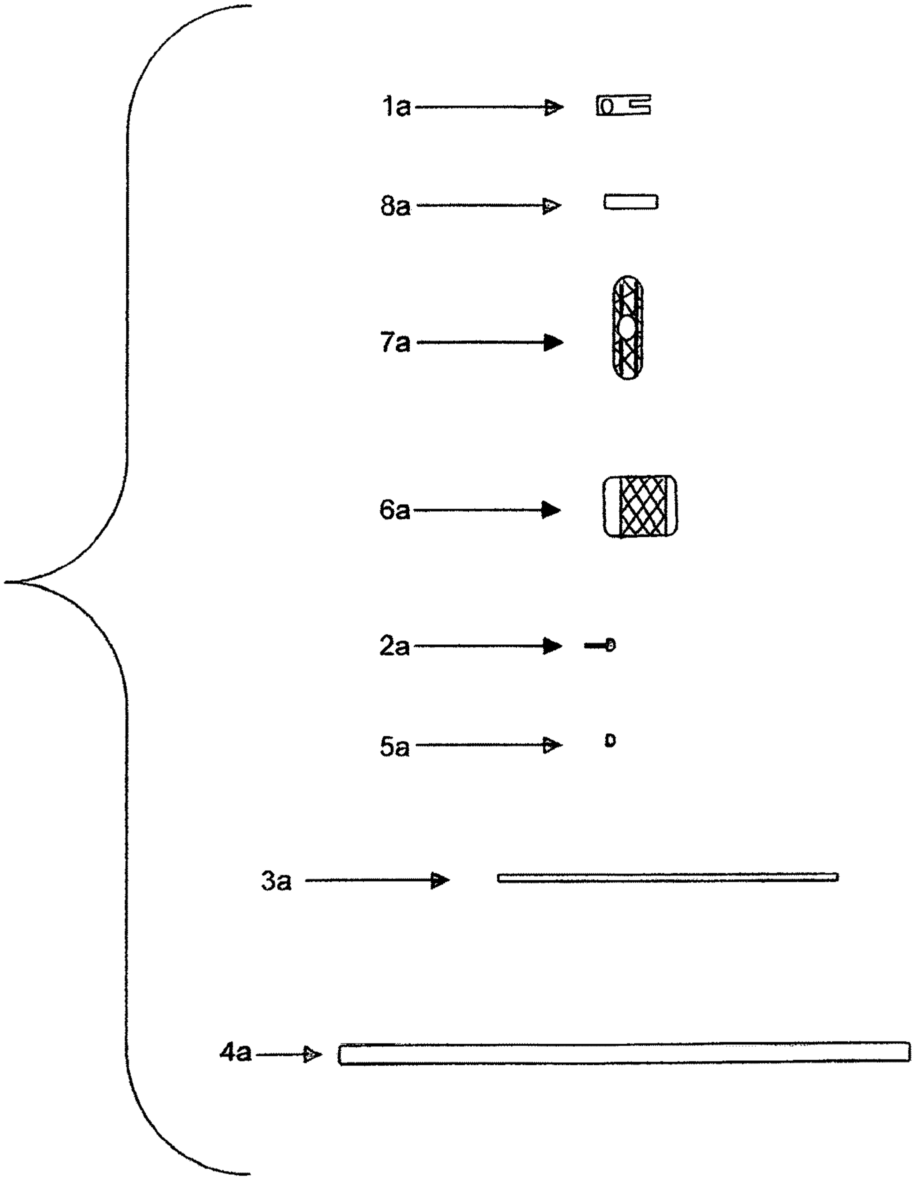

FIG. 1*a* depicts the materials for the extended rod assembly.

FIG. 1 prep & assemble; extended rod assembly 500, apply JB weld epoxy to one end of steel cable 3*a*, and insert extractor head 1*a*, to steel cable 3*a*, apply JB weld to small nail 2*a*, insert through small hole of extractor head 1*a*, and allow epoxy to setup. Apply JB weld ¾" to opposite end of steel cable 3*a*, insert steel cable 3*a*, in to ¾"×⅛" deep hole of rod 4*a*, apply JB weld to small nail head 5*a*, and imbed on to small hole, side of rod 4*a*, and allow epoxy to setup. Note: The bonding agent may vary from JB weld to soldering or brazing, etc.

Opposite side of rod 4*a*, insert compression nut 6*a*, sliding threaded end through first. Imbed rod control knob 7*a*, to rod 4*a*, insert ⅛" set pin 8*a*, through hole of rod control knob 7*a*, and rod 4*a*.

Figure 2:
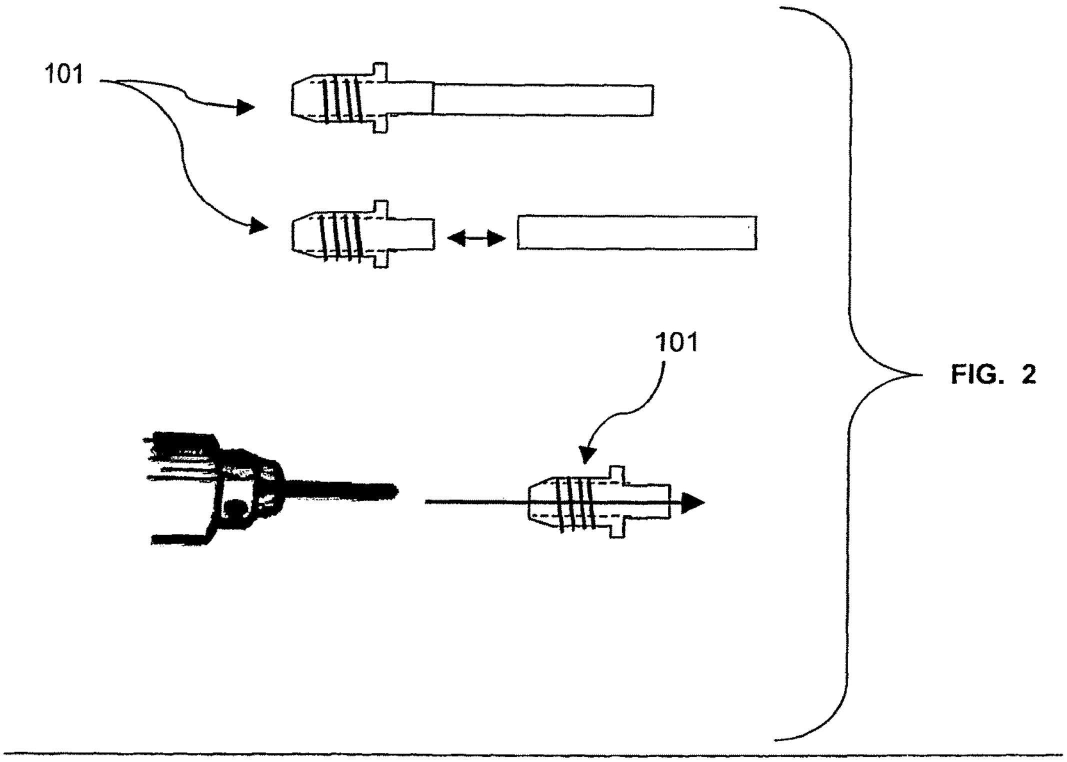
FIG. 2 illustrates preparing of the universal line service valve.

FIG. 2 debraze and separate service valve 101 from copper tube discarding copper tube. Bore through service valve 101 with ¼" drill bit. Four service valves needed for this kit.

Figure 3:
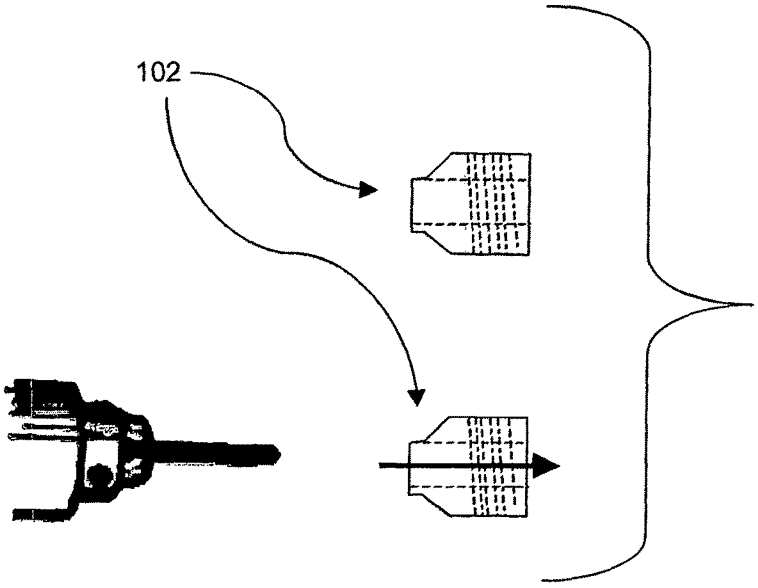
FIG. 3 illustrates preparing of the compression nut.

FIG. 3 compression nut 102 is removed from a hvac refrigerant hose. Bore through compression nut 102 with 5⁄16" drill bit carefully not damaging inner threads. Four compression nuts are needed for this kit.

Figure 4:
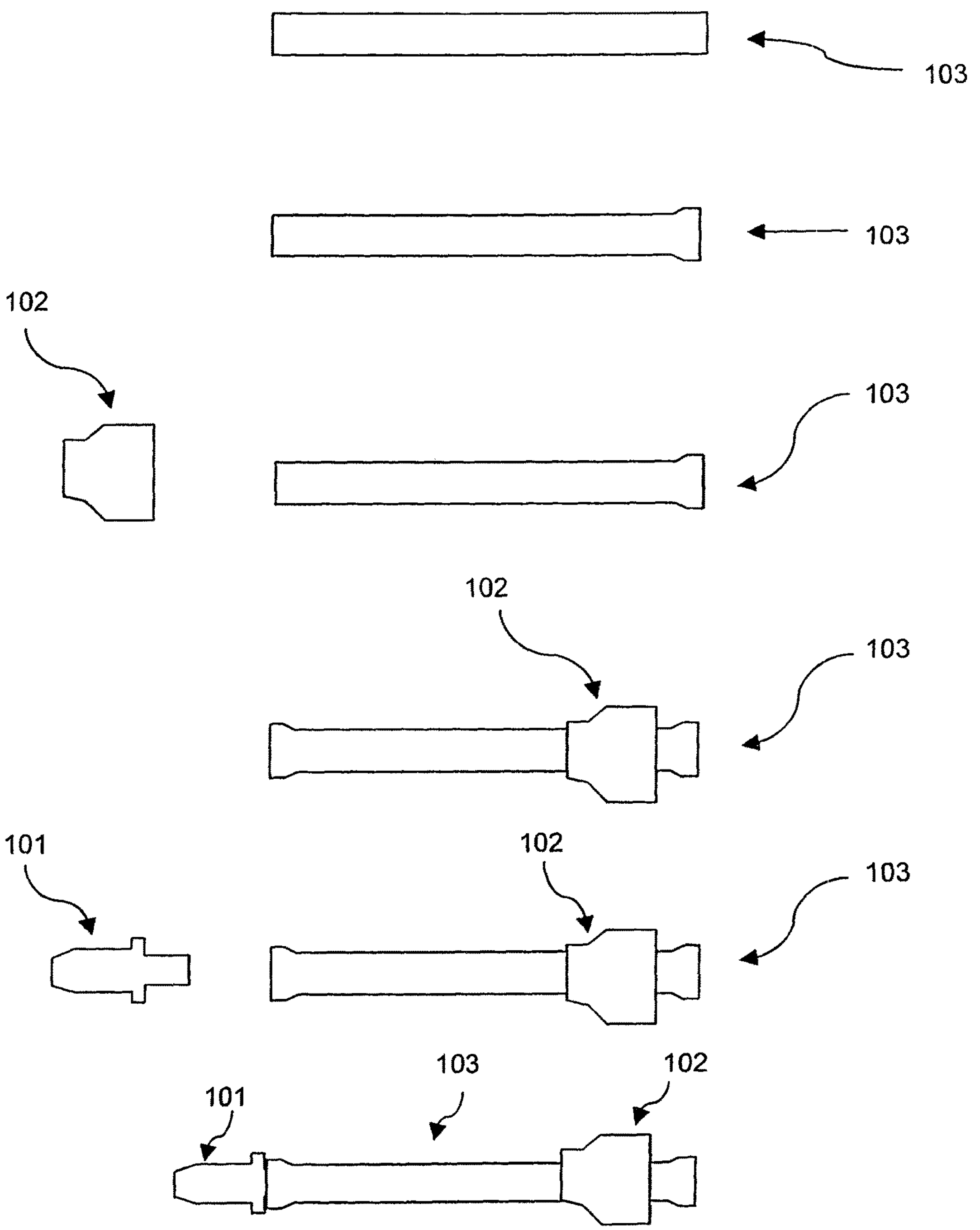
FIG. 4 shows preparation and assembly of the 4⅛"L straight extension adapter 600.

FIG. 4 prep & assemble; 4⅛"L straight extension adapter 600. 5⁄16"D×3⅛"L copper tube 103, swedge one end of copper tube 103 to ⅜", and insert compression nut 102 sliding threaded end through first. Swedge opposite end of copper tube 103 to ⅜" insert and braze service valve 101 to this end of copper tube 103.

Figure 5:
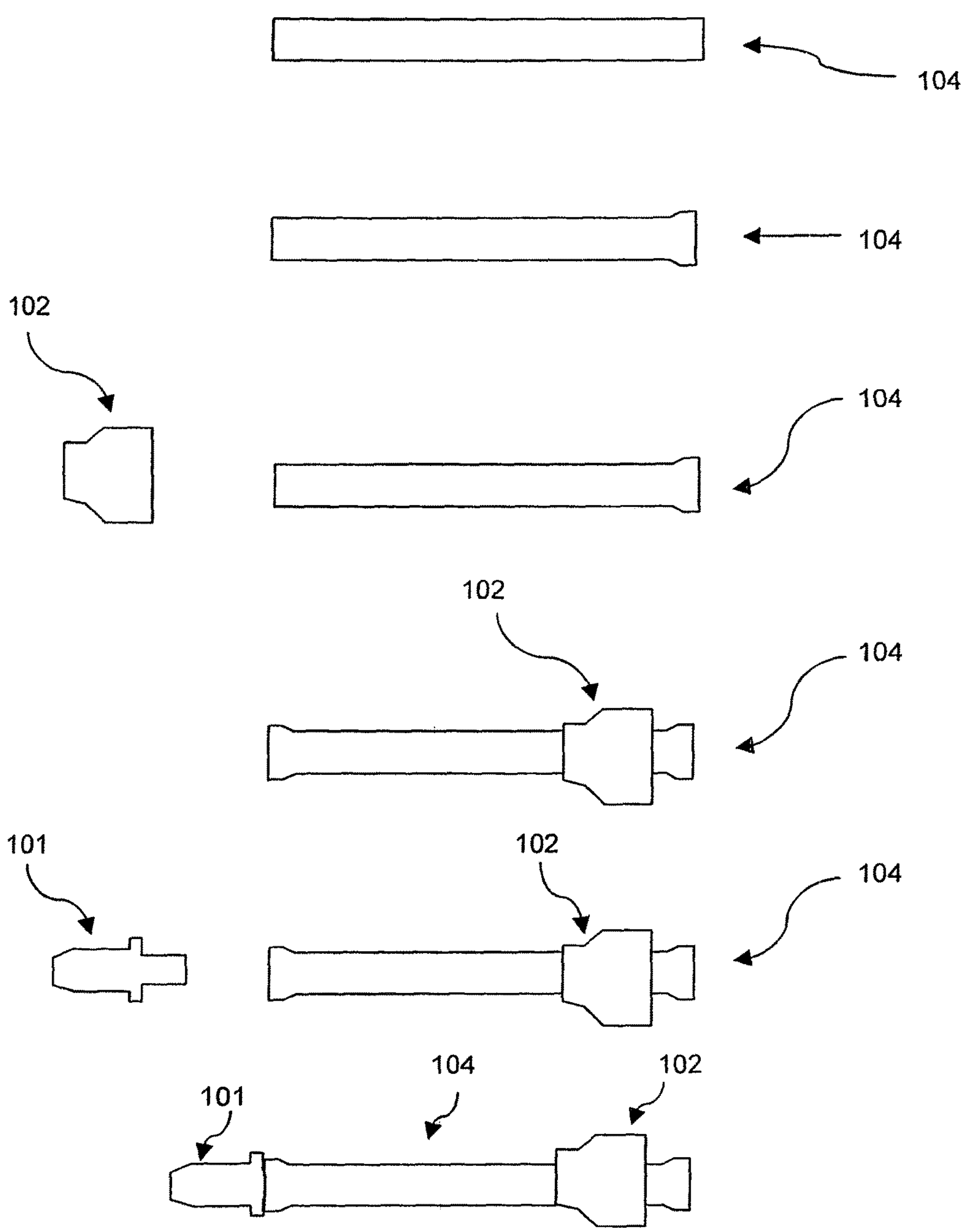
FIG. 5 shows preparation and assembly of the 6⅞"L straight extension adapter 700.

FIG. 5 prep & assemble; 6⅞"L straight extension adapter 700. 5⁄16"D×6⅛"L copper tube 104; swedge one end of copper tube 104 to ⅜", and insert compression nut 102 sliding threaded end through first. Swedge opposite end sliding threaded end through first. Swedge opposite end of copper tube 104 to ⅜" insert and braze service valve of copper tube 104 to ⅜" insert and braze service valve 101 to this end of copper tube 104.

Figure 6:
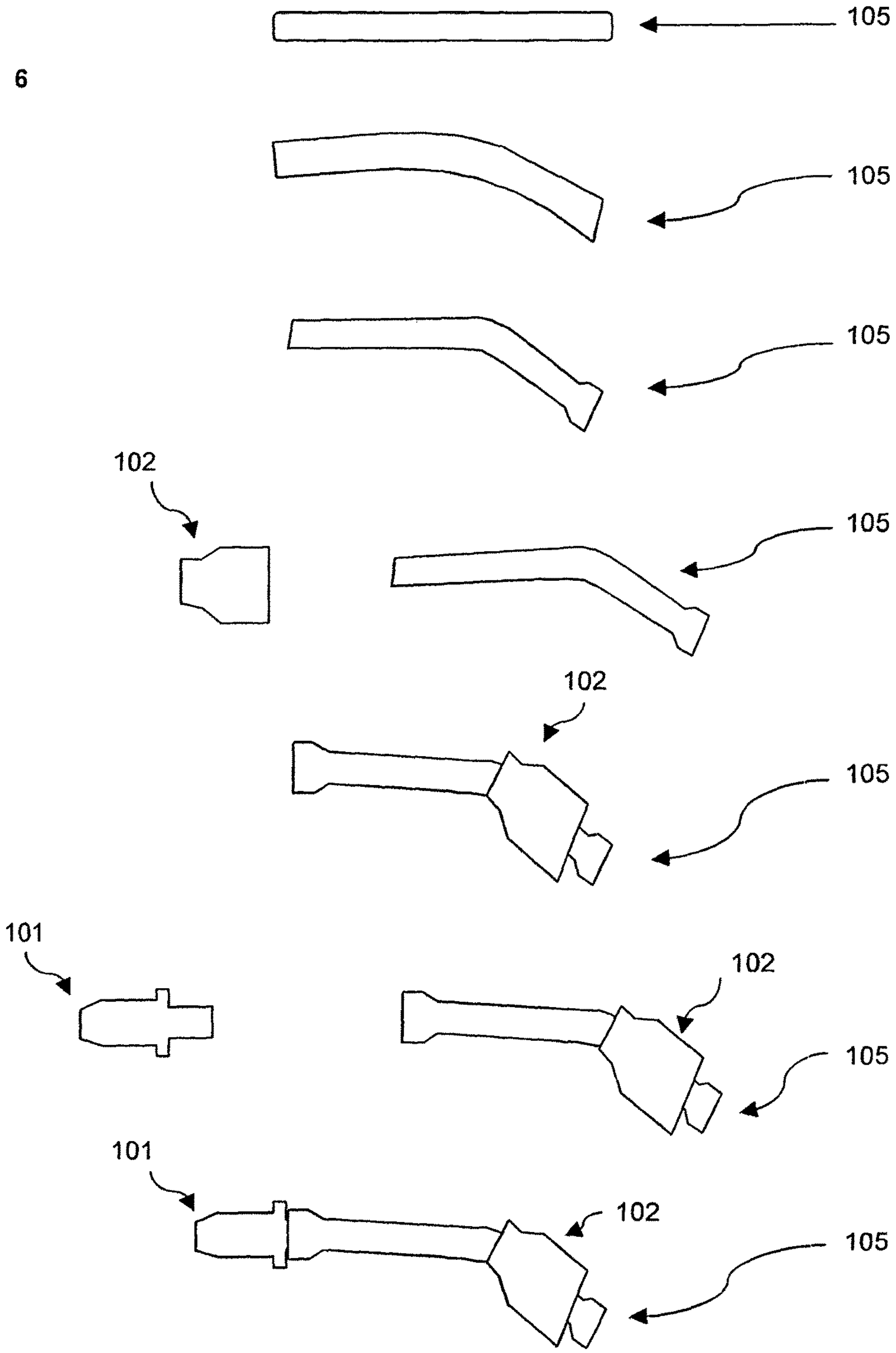
FIG. 6 shows preparation and assembly of the 2½"L offset extension adapter 800.

FIG. 6 prep & assemble; 2½"L offset extension adapter 800. 5⁄16"D×2½"L copper tube 105, bend copper tube 105 twenty degrees and swedge one end to ⅜", and insert compression nut 102 sliding threaded end through first. Swedge opposite end of copper tube 105 to ⅜" insert and braze service valve 101 to this end of copper tube 105.

Figure 7:
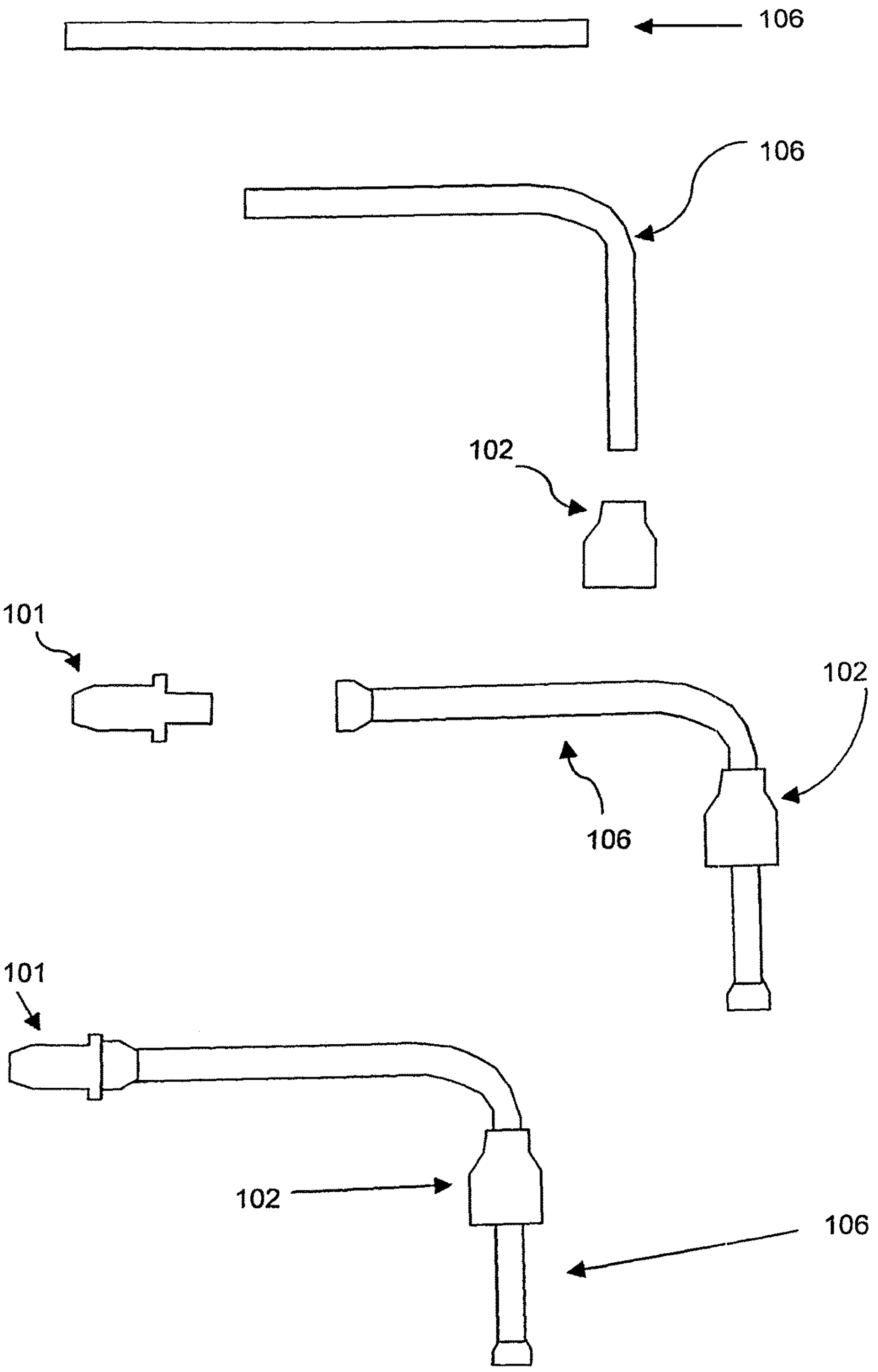
FIG. 7 shows preparation and assembly of the ninety degree extension adapter 900.

FIG. 7 prep & assemble; ninety degree extension adapter 900. 5⁄16"D×6⅛"L copper tube 106; bend copper tube 106 ninety degrees and swedge one end to ⅜", and insert compression nut 102 sliding threaded end through first. Swedge opposite end of copper tube 106 to ⅜" insert and braze service valve 101 to this end of copper tube 106.

Figure 8:
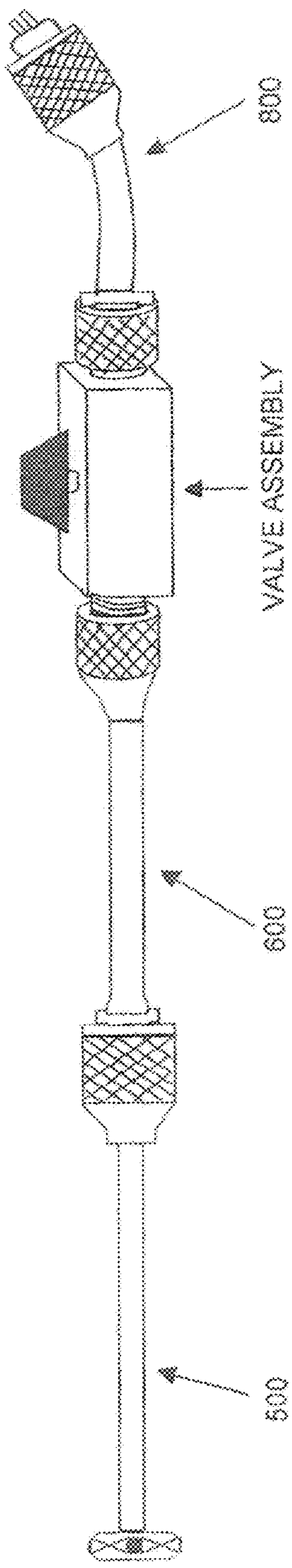
FIG. 8 shows extended rod assembly and extension adapters assembled to the shut-off valve assembly.

FIG. 8 Extended rod assembly 500, straight extension adapter 600, and 2½"L offset extension adapter 800 assembled to the shut-off valve assembly of said tool for pressurized refrigeration systems.

What I claim:

1. A set of adapters and an extended rod assembly that works with an existing tool for pressurized refrigeration systems having removable valve core elements, comprising: an extended rod assembly, a 4⅛" long adapter, a 6⅞" long adapter, a 20 degree offset adapter and a 90 degree adapter; said existing tool having a first opening and a second opening and a shut-off valve, said shut-off valve having positions to open and close a passageway between said first opening and said second opening; said 4⅛" long adapter threads to said second opening, extending said passageway of said shut-off valve; said extended rod assembly threads to said 4⅛" long adapter; said 20 degree offset adapter, said 6⅞" long adapter, and said 90 degree adapter threads to said first opening extending said passageway of said shut-off valve; said extended rod assembly having a rod to move through passageways of said adapters, when said shut-off valve is open, and engage with the said adapters to the pressurized refrigeration systems having said removable valve core elements, and said extended rod assembly further having a threaded portion controlling axial movement of said rod through said passageways of said adapters and said shut-off valve; wherein to provide said existing tool clearance from obstructions and the said removable valve core elements can be removed and replaced, while under pressure.

2. The adapter set as recited in claim 1 wherein said 4⅛" long adapter comprises threaded fittings.

3. The adapter set as recited in claim 1 wherein said 6⅞" long adapter comprises threaded fittings.

4. The adapter set as recited in claim 1 wherein said 20 degree adapter comprises threaded fittings.

5. The adapter set as recited in claim 1 wherein said 90 degree adapter comprises threaded fittings.

6. The extended rod assembly as recited in claim 1 wherein said extended rod assembly is configured to thread to said 4⅛" long adapter threaded to said second opening of said shut-off valve.

7. The set of adapters as recited in claim 1 wherein said 6⅞" long adapter, said 20 degree adapter, and said 90 degree adapter are configured to thread to said first opening of said shut-off valve.

8. The set of adapters and the extended rod assembly as recited in claim 1; wherein to provide said existing tool clearance from obstructions said removable valve core elements can be removed and replaced, while under pressure.

* * * * *